(12) United States Patent
Kim et al.

(10) Patent No.: US 12,378,447 B2
(45) Date of Patent: Aug. 5, 2025

(54) SEMICONDUCTOR ADHESIVE COMPOSITION AND SEMICONDUCTOR ADHESIVE FILM COMPRISING CURED PRODUCT THEREOF

(71) Applicant: LG CHEM, LTD., Seoul (KR)

(72) Inventors: Eun Bum Kim, Daejeon (KR); Kwang Joo Lee, Daejeon (KR); Jung Hak Kim, Daejeon (KR); Ju Hyeon Kim, Daejeon (KR); Yoon Sun Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 413 days.

(21) Appl. No.: 17/769,445

(22) PCT Filed: Oct. 20, 2020

(86) PCT No.: PCT/KR2020/014322
§ 371 (c)(1),
(2) Date: Apr. 15, 2022

(87) PCT Pub. No.: WO2021/080286
PCT Pub. Date: Apr. 29, 2021

(65) Prior Publication Data
US 2023/0174834 A1 Jun. 8, 2023

(30) Foreign Application Priority Data
Oct. 22, 2019 (KR) .................. 10-2019-0131506

(51) Int. Cl.
*C09J 133/10* (2006.01)
*C09J 11/04* (2006.01)
(Continued)

(52) U.S. Cl.
CPC ............ *C09J 133/10* (2013.01); *C09J 11/04* (2013.01); *C09J 11/08* (2013.01); *C09J 163/00* (2013.01);
(Continued)

(58) Field of Classification Search
CPC . C09J 133/10; C09J 11/04; C09J 11/08; C09J 163/00; C09J 2203/326;
(Continued)

(56) References Cited

U.S. PATENT DOCUMENTS

2003/0045669 A1* 3/2003 Tsuji .................... C09J 7/22
528/170
2018/0237667 A1 8/2018 Kim et al.
2018/0251663 A1 9/2018 Trumble et al.

FOREIGN PATENT DOCUMENTS

JP H08239636 A 9/1996
JP 2007-123710 A 5/2007
(Continued)

OTHER PUBLICATIONS

JP2017147422A Machine Translation of Description (Year: 2024).*
(Continued)

*Primary Examiner* — Cynthia L Schaller
(74) *Attorney, Agent, or Firm* — ROTHWELL, FIGG, ERNST & MANBECK, P.C.

(57) ABSTRACT

The present invention relates to an adhesive composition for a semiconductor and an adhesive film for a semiconductor including a cured product thereof, and in particular, to an adhesive composition for a semiconductor capable of removing voids occurring between an adherend and an adhesive and reducing bleed-out, and an adhesive film for a semiconductor including a cured product thereof.

11 Claims, 2 Drawing Sheets

(51) Int. Cl.
*C09J 11/08* (2006.01)
*C09J 163/00* (2006.01)

(52) U.S. Cl.
CPC .... *C09J 2203/326* (2013.01); *C09J 2301/304* (2020.08); *C09J 2301/312* (2020.08); *C09J 2301/408* (2020.08); *C09J 2301/414* (2020.08)

(58) Field of Classification Search
CPC ........... C09J 2301/304; C09J 2301/312; C09J 2301/408; C09J 2301/414; C09J 2433/00; C09J 2463/00; C09J 7/10; C09J 7/30; C09J 133/04; C09J 133/06; C09J 133/068; C08F 220/325; C08G 59/62; C08G 59/621; C08K 3/013; C08K 3/26; C08K 3/36; C08K 5/00; C08K 5/053; C08K 5/0025; C08K 2003/267; C08L 33/04; C08L 63/00
See application file for complete search history.

(56) References Cited

FOREIGN PATENT DOCUMENTS

| | | | |
|---|---|---|---|
| JP | 2007-284576 A | | 11/2007 |
| JP | 2008-283199 A | | 11/2008 |
| JP | 2012-092225 A | | 5/2012 |
| JP | 2016-079270 A | | 5/2016 |
| JP | 2017147422 A | * | 8/2017 |
| JP | 2019-509620 A | | 4/2019 |
| KR | 10-2007-0015418 A | | 2/2007 |
| KR | 10-2010-0066789 A | | 6/2010 |
| KR | 10-1188758 B | | 10/2012 |
| KR | 10-2013-0109070 A | | 10/2013 |
| KR | 10-1456397 B | | 10/2014 |
| KR | 10-2016-0072480 A | | 6/2016 |
| KR | 10-2017-0113430 A | | 10/2017 |
| KR | 10-2018-0037217 A | | 4/2018 |
| KR | 10-1832450 B | | 4/2018 |
| KR | 10-2019-0097954 A | | 8/2019 |
| WO | 2009-067113 A | | 5/2009 |

OTHER PUBLICATIONS

Rymuszka et al., "Wettability and Thermal Analysis of Hydrophobic Poly (methyl methacrylate)/silica Nanocomposites," Adsorption Science & Technology, 2017, vol. 35 (5-6) 560-571. (Year: 2017).*
International Search Report dated Feb. 1, 2021, issued in the corresponding International Application No. PCT/KR2020/014322, 5 pages.

* cited by examiner

[Fig. 1A]
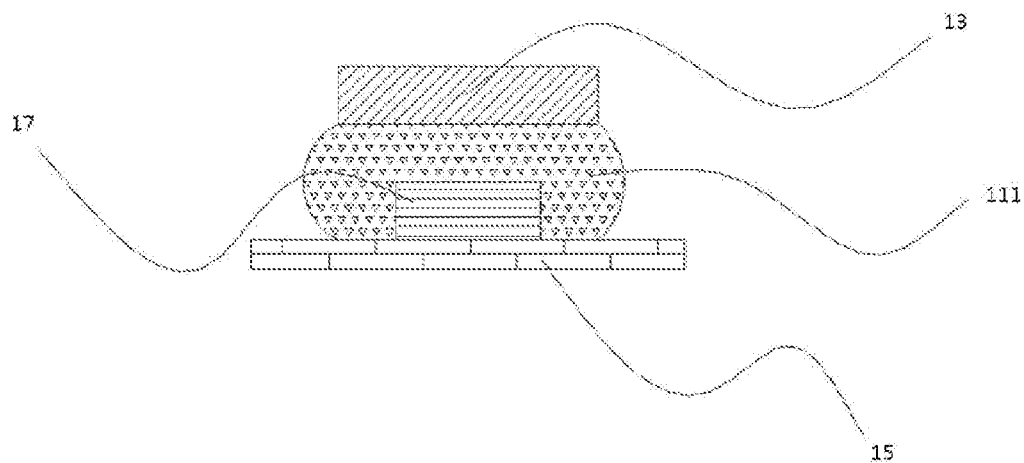
[Fig. 1B]
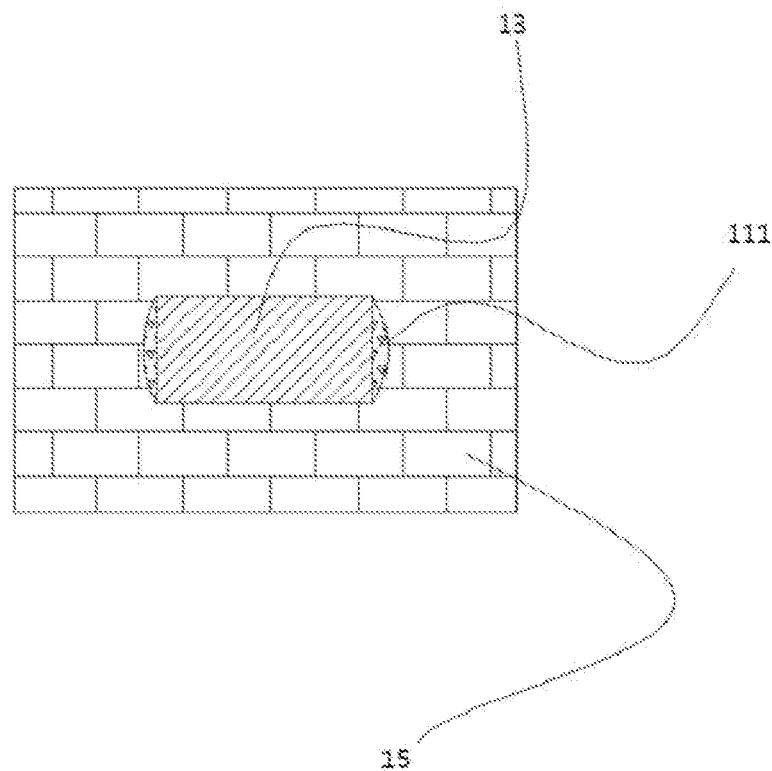

[Fig. 2A]
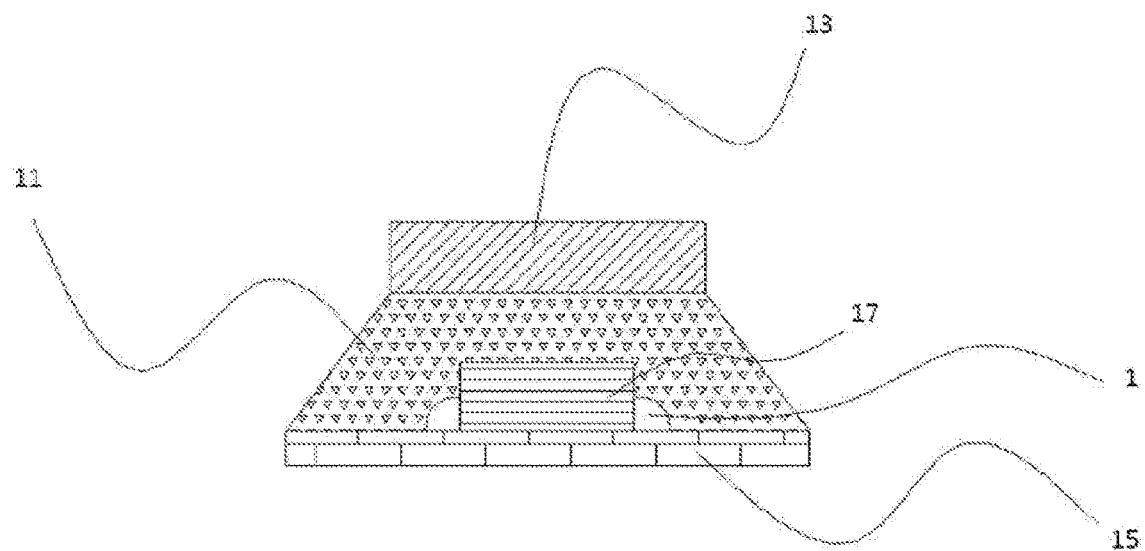
[Fig. 2B]
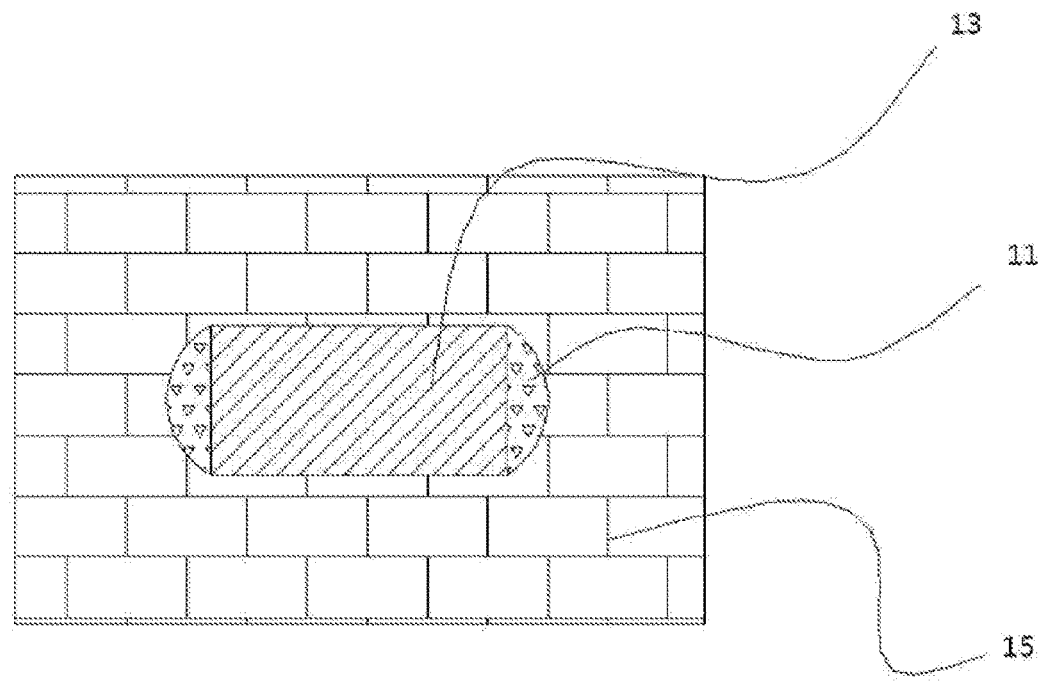

SEMICONDUCTOR ADHESIVE COMPOSITION AND SEMICONDUCTOR ADHESIVE FILM COMPRISING CURED PRODUCT THEREOF

This application is a 35 U.S.C. 371 National Phase Entry Application from PCT/KR2020/014322 filed on Oct. 20, 2020, which claims priority to and the benefit of Korean Patent Application No. 10-2019-0131506 filed in the Korean Intellectual Property Office on Oct. 22, 2019, the entire contents of which are incorporated herein by reference.

TECHNICAL FIELD

The present invention relates to an adhesive composition for a semiconductor and an adhesive film for a semiconductor including a cured product thereof, and in particular, to an adhesive composition for a semiconductor capable of removing voids occurring between an adherend and an adhesive and reducing bleed-out of the adhesive composition for a semiconductor, and an adhesive film for a semiconductor including a cured product thereof.

BACKGROUND OF THE INVENTION

In recent, with a rapid increase in the need for high density and high integration of a semiconductor package, the sizes of semiconductor chips are gradually increasing, and in order to improve a degree of integration, a stack package method of stacking chips in multi-stage is gradually increasing.

The trend of semiconductor package development is that the above-mentioned semiconductor chips are rapidly becoming smaller and thinner, and higher in performance, and for the purpose of increasing package capacity, the thicknesses of all semiconductor wafers are gradually becoming ultrathin to 20 μm or less so that more chips can be stacked in the same package.

Meanwhile, in order to overcome the problem with the reduction in the communication speed of the semiconductor package and degradation in the quality and production yield of the semiconductor package due to miniaturization and thinness of the semiconductor, a method of fixing a controller on a substrate, covering the fixed controller with an adhesive, and then stacking a chip thereon is applied.

However, if the adhesive is not in sufficiently close contact with an upper portion and a side surface of the controller when the chip is attached on the controller as described above, there is a problem in that voids remain even after treatment with a pressure oven is performed.

Further, there is a problem in that bleed-out in which the adhesive bleeds out of an edge of the chip occurs while the chip is attached onto the controller.

BRIEF SUMMARY OF THE INVENTION

The technical problem of the present invention is to provide an adhesive composition for a semiconductor for reducing voids and bleed-out occurring in a three-dimensional mounting process of a semiconductor chip, and an adhesive film for a semiconductor including a cured product thereof.

However, the technical problem of the present invention is not limited to the aforementioned problem, and the other unmentioned problems will be clearly understood by those skilled in the art from the following description.

An embodiment of the present invention provides an adhesive composition for a semiconductor, including a thermosetting resin, a thermoplastic resin, a curing agent and a nonionic surfactant.

An embodiment of the present invention provides an adhesive film for a semiconductor, including a cured product of the adhesive composition for a semiconductor according to an embodiment of the present invention.

Advantageous Effects

An adhesive composition for a semiconductor according to an embodiment of the present invention may have improved surface tension by adding a nonionic surfactant.

An adhesive film for a semiconductor according to an embodiment of the present invention may reduce voids and bleed-out of the adhesive that may occur during die bonding, by including a cured product of the adhesive composition for a semiconductor.

BRIEF DESCRIPTION OF DRAWINGS

FIGS. 1A and 1B are a side sectional view and front view of a semiconductor device, respectively, according to each of Examples 1 to 3.

FIGS. 2A and 2B are a side sectional view and front view of a semiconductor device, respectively, according to each of Comparative Examples 1 to 3.

DETAILED DESCRIPTION OF THE INVENTION

In the present specification, "including" any component will be understood to imply the inclusion of other components rather than the exclusion of other components, unless explicitly described to the contrary.

In the present specification, the glass transition temperature refers to a value measured by differential scanning calorimetry.

Hereinafter, the present invention will be described in more detail.

An embodiment of the present invention provides an adhesive composition for a semiconductor, including a thermosetting resin, a thermoplastic resin, a curing agent and a nonionic surfactant.

The adhesive composition for a semiconductor according to an embodiment of the present invention may include a thermosetting resin, a thermoplastic resin, a curing agent and a nonionic surfactant, such that the adhesive composition for a semiconductor may have improved surface tension and an adhesive for a semiconductor may have reduced wettability, thereby reducing a fillet length.

An embodiment of the present invention includes a nonionic surfactant.

According to an embodiment of the present invention, the nonionic surfactant may be one selected from the group consisting of polyoxyethylene alkyl ether, oleic acid diethanolamide, polysorbate, polyethylene glycol, hydroxyethyl cellulose, and a combination thereof. It is possible to reduce the wettability of the adhesive for a semiconductor while improving the surface tension thereof, by selecting the nonionic surfactant from the above-mentioned compounds, thereby preventing the occurrence of voids between a controller, that is, a semiconductor element and the adhesive, which occurs in the manufacturing process of a semiconductor package, that is, a semiconductor device, and reducing the bleed-out of the adhesive.

According to an embodiment of the present invention, the nonionic surfactant may be included in an amount of 0.1 to 10 parts by weight, based on 100 parts by weight of the total content of the thermosetting resin and the thermoplastic resin. Specifically, the nonionic surfactant may be included in an amount of 1 to 9 parts by weight, 2 to 8 parts by weight, 3 to 8 parts by weight, 4 to 7 parts by weight, 5 to 6 parts by weight, 1 to 5 parts by weight, 5 to 9 parts by weight, 8 to 10 parts by weight, 9 to 10 parts by weight, or 2 to 3 parts by weight, based on 100 parts by weight of the total content of the thermosetting resin and the thermoplastic resin. It is possible to reduce the wettability of the adhesive for a semiconductor while improving the surface tension thereof, by adjusting the content of the nonionic surfactant within the above-mentioned range, thereby preventing the occurrence of voids between the controller and the adhesive, which occurs in the manufacturing process of the semiconductor package, and reducing the bleed-out of the adhesive.

According to an embodiment of the present invention, the adhesive composition for a semiconductor may further include a hydrophilic additive. As above-mentioned, the adhesive composition for a semiconductor may further include a hydrophilic additive, such that the adhesive composition for a semiconductor may have improved surface tension and the adhesive for a semiconductor may have reduced wettability, thereby reducing the fillet length.

According to an embodiment of the present invention, the hydrophilic additive may be included in an amount of 0.1 to 20 parts by weight, based on 100 parts by weight of the total content of the thermosetting resin and the thermoplastic resin. Specifically, the hydrophilic additive may be included in an amount of 1 to 19 parts by weight, 2 to 18 parts by weight, 3 to 18 parts by weight, 4 to 17 parts by weight, 5 to 16 parts by weight, 6 to 15 parts by weight, 7 to 14 parts by weight, 8 to 13 parts by weight, 9 to 12 parts by weight, or 10 to 11 parts by weight, based on 100 parts by weight of the total content of the thermosetting resin and the thermoplastic resin. It is possible to reduce the wettability of the adhesive for a semiconductor while improving the surface tension thereof, by adjusting the content of the hydrophilic additive within the above-mentioned range, thereby preventing the occurrence of voids between the controller and the adhesive, which occurs in the manufacturing process of the semiconductor package, and reducing the bleed-out of the adhesive.

According to an embodiment of the present invention, the hydrophilic additive may be one selected from the group consisting of a hydrophilic polymer, an anionic surfactant, a sugar alcohol, and a combination thereof. It is possible to improve the surface tension of the adhesive for a semiconductor by selecting the hydrophilic additive from the above-mentioned compounds.

According to an embodiment of the present invention, the hydrophilic polymer may be one selected from the group consisting of a polyvinylpyrrolidone derivative compound, a polyvinyl alcohol derivative compound, a polyether derivative compound, a polysaccharide derivative compound, and a combination thereof. It is possible to reduce the wettability of the adhesive composition by selecting the hydrophilic polymer from the above-mentioned compounds, thereby reducing the fillet length of the semiconductor package.

According to an embodiment of the present invention, the anionic surfactant may be one selected from the group consisting of potassium laurate, sodium lauryl sulfate, and a combination thereof. It is possible to reduce the wettability of the adhesive composition by selecting the anionic surfactant from the above-mentioned compounds, thereby reducing the fillet length of the semiconductor package.

According to an embodiment of the present invention, the sugar alcohol may be one selected from the group consisting of mannitol, xylitol, erythritol, sorbitol, trehalose, maltitol, and a combination thereof. It is possible to reduce the wettability of the adhesive composition by selecting the sugar alcohol from the above-mentioned compounds, thereby reducing the fillet length of the semiconductor package.

An embodiment of the present invention includes a thermoplastic resin.

According to an embodiment of the present invention, the thermoplastic resin may include one selected from the group consisting of polyimide, polyether imide, polyester imide, polyamide, polyether sulfone, polyether ketone, polyolefin, polyvinyl chloride, phenoxy, a reactive butadiene acrylonitrile copolymer rubber, a (meth)acrylate-based resin, and a combination thereof. More specifically, the thermoplastic resin may include a (meth)acrylate-based resin including a (meth)acrylate-based repeating unit having an epoxy-based functional group.

According to an embodiment of the present invention, the (meth)acrylate-based resin may include a (meth)acrylate-based repeating unit including an epoxy-based functional group, and may be a (meth)acrylate-based resin having a glass transition temperature of $-10°$ C. to $30°$ C.

According to an embodiment of the present invention, the (meth)acrylate-based resin may include 0.1% to 30% by weight of a (meth)acrylate-based repeating unit including an epoxy-based functional group. The epoxy-based functional group may include an epoxy group or a glycidyl group.

According to an embodiment of the present invention, the thermoplastic resin may include a (meth)acrylate-based resin including 0.1% to 30% by weight of a (meth)acrylate-based repeating unit having an epoxy-based functional group.

An embodiment of the present invention includes a thermosetting resin. Specifically, the thermosetting resin may be an epoxy resin.

According to an embodiment of the present invention, the epoxy resin may be one selected from the group consisting of a bisphenol-based epoxy resin, a biphenyl-based epoxy resin, a naphthalene-based epoxy resin, a fluorene-based epoxy resin, a phenol novolac-based epoxy resin, a cresol novolac-based epoxy resin, a trishydroxylphenylmethane-based epoxy resin, a tetraphenylmethane-based epoxy resin, and a combination thereof.

According to an embodiment of the present invention, the bisphenol-based epoxy resin may be a bisphenol A-type epoxy resin, a bisphenol F-type epoxy resin, a bisphenol S-type epoxy resin, a hydrogenated bisphenol A-type epoxy resin, and a bisphenol AF-type epoxy resin.

According to an embodiment of the present invention, the thermosetting resin may include a liquid epoxy resin having a viscosity of 1 mPa·s to 20,000 mPa·s at a temperature of $20°$ C. to $25°$ C. It is possible to prevent contamination from occurring due to excessive flow of the resin during a die attach process, and to prevent pick-up performance from remarkably deteriorating due to strong stickiness of an adhesive layer, by adjusting the viscosity of the liquid epoxy resin within the above-mentioned range.

According to an embodiment of the present invention, when two types of epoxy resins are applied as the thermosetting resin, an epoxy resin which is a liquid at 10 to $35°$ C. and an epoxy resin which is a solid at 10 to $35°$ C., may be used by being mixed at a weight ratio of 1:0.4 to 1:2. It is possible to prevent contamination from occurring due to excessive flow of the resin during a die attach process, to prevent pick-up performances from remarkably deteriorating due to strong stickiness of the adhesive layer, and to improve compatibility and reactivity with the thermoplastic resin, by adjusting the weight ratio of the liquid epoxy resin and the solid epoxy resin within the above-mentioned range.

According to an embodiment of the present invention, the epoxy resin may further include at least one epoxy resin selected from the group consisting of a cresol novolac-type epoxy resin having a softening point of 50° C. to 100° C. and a bisphenol A epoxy resin having a softening point of 50° C. to 100° C., together with a biphenyl-based epoxy resin having a softening point of 50° C. to 100° C.

According to an embodiment of the present invention, the epoxy resin may include at least one epoxy resin selected from the group consisting of the cresol novolac-type epoxy resin having a softening point of 50° C. to 100° C. and the bisphenol A epoxy resin having a softening point of 50° C. to 100° C., at a weight ratio of 0.25 to 1.25 or 0.3 to 1.1, relative to the biphenyl-based epoxy resin having a softening point of 50° C. to 100° C.

According to an embodiment of the present invention, the epoxy resin may have an average epoxy equivalent weight of 100 to 1,000. The average epoxy equivalent weight may be calculated based on a weight ratio and an epoxy equivalent weight of each epoxy resin included in the epoxy resin.

According to an embodiment of the present invention, the adhesive composition for a semiconductor may include a novolac-based phenol resin as the curing agent.

According to an embodiment of the present invention, the curing agent may include a novolac-based phenol resin having a softening point of 60° C. to 150° C.

According to an embodiment of the present invention, the novolac-based phenol resin has a chemical structure in which a ring is positioned between reactive functional groups. Due to such structural characteristics, the novolac-based phenol resin may further lower hygroscopic property of the adhesive film and further increase stability in an IR reflow process at high temperature, thereby serving to prevent peeling or reflow cracking, etc. of the adhesive film.

According to an embodiment of the present invention, specific examples of the novolac-based phenol resin may include one selected from the group consisting of a novolac phenol resin, a xylok novolac phenol resin, a cresol novolac phenol resin, a biphenyl novolac phenol resin, a bisphenol A novolac phenol resin, and a combination thereof.

According to an embodiment of the present invention, the novolac-based phenol resin may preferably have a softening point of 60° C. or higher, or 60° C. to 150° C., or 105° C. to 150° C., or 70° C. to 120° C. A novolac-based phenol resin having a softening point of 60° C. or higher makes it possible to have sufficient heat resistance, strength, and adhesive properties after curing of the adhesive film. However, if the novolac-based phenol resin has excessively high softening point, fluidity of the adhesive film is lowered, resulting in the generation of voids inside the adhesive in the actual process of manufacturing a semiconductor. Therefore, reliability or quality of a final product may be significantly degraded.

According to an embodiment of the present invention, the novolac-based phenol resin preferably has a hydroxyl equivalent weight of 80 g/eq to 300 g/eq and a softening point of 60° C. to 150° C.

According to an embodiment of the present invention, the adhesive composition for a semiconductor may further include a curing catalyst and an inorganic filler. The curing catalyst may facilitate the action of the curing agent or the curing of the adhesive composition for a semiconductor.

According to an embodiment of the present invention, the curing catalyst may be one selected from the group consisting of phosphorus-based compounds, boron-based compounds, phosphorus-boron-based compounds, imidazole-based compounds, and a combination thereof. More specifically, the curing catalyst is preferably 2-phenyl imidazole.

According to an embodiment of the present invention, the inorganic filler (filling material) may include one selected from the group consisting of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, aluminum borate, and a combination thereof.

According to an embodiment of the present invention, the inorganic filler may preferably have an average particle diameter (based on the longest outer diameter) of 0.1 μm to 10 μm, or 0.1 μm to 5.0 μm, or 0.1 μm to 2.0 μm. If the inorganic filler has an excessively small particle diameter, it may be easily agglomerated in the adhesive film. On the other hand, if the inorganic filler has an excessively large particle diameter, the inorganic filler may cause damage to a semiconductor circuit and decrease in adhesive properties of the adhesive film.

According to an embodiment of the present invention, the inorganic filler may include silica and magnesium carbonate at a weight ratio of 1:0.001 to 1:1. It is possible to improve mechanical properties of the adhesive film for a semiconductor by adjusting the weight ratio of silica and magnesium carbonate within the above-mentioned range.

According to an embodiment of the present invention, a paint or a pigment may be applied to the adhesive film for a semiconductor. The fillet, etc. of the material may be clearly observed by applying the paint or pigment to impart a black color to the adhesive film for a semiconductor, thereby reducing a defect rate and improving work efficiency. In addition, it is possible to provide an adhesive film in which an adhesive body inside the package is prevented from being visible even from outside the package, by applying the paint or pigment.

According to an embodiment of the present invention, in order to implement the adhesive film for a semiconductor in black, substances that usually turn black may be applied, for example, reactive dyes, azo dyes, nigrosines, perylene pigments, mixed-phase pigments (solid-solution pigments), Aniline Black, Perylene Black, Brilliant Black BN, Reactive Black 5, Sulfur Black T, Carbon Black, etc.

According to an embodiment of the present invention, the adhesive film for semiconductor may include a coupling agent. The type of the coupling agent is not particularly limited, but the coupling agent may be preferably 2-(3,4-epoxycyclohexyl)-ethyl trimethoxysilane, 3-glycidoxypropyl trimethoxysilane, 3-glycidoxypropylmethyl-diethoxysilane, 3-glycidoxypropyl triethoxysilane, N-(2-aminoethyl) 3-aminopropyl methyl dimethoxysilane, N-(2-aminoethyl) 3-aminopropyl-trimethoxysilane, N-(2-aminoethyl) 3-aminopropyl-triethoxysilane, 3-aminopropyl-trimethoxysilane, 3-aminopropyl-triethoxysilane, 3-triethoxysilyl-N-(1,3 dimethyl-butylidene)propylamine, N-phenyl-3-aminopropyl trimethoxysilane, mercapto-containing 3-mercaptopropyl methyldimethoxysilane, 3-mercaptopropyl trimethoxysilane and gamma-glycidoxy propyltrimethoxysilane, etc.

Another embodiment of the present invention provides an adhesive film for a semiconductor, including a cured product of the adhesive composition for a semiconductor.

The adhesive film for a semiconductor according to another embodiment of the present invention may reduce voids and bleed-out of the adhesive that may occur during die bonding, by using the adhesive film for a semiconductor.

According to an embodiment of the present invention, the cured product of the adhesive composition may have a water contact angle of 150 degrees or less. Specifically, the cured product may preferably have a water contact angle of more than 0 degree and less than or equal to 150 degrees, 10 degrees or higher and 140 degrees or less, 20 degrees or higher and 130 degrees or less, 30 degrees or higher and 120 degrees or less, 40 degrees or higher and 110 degrees or less, 50 degrees or higher and 100 degrees or less, 60 degrees or higher and 90 degrees or less, or 70 degrees or higher and 80 degrees or less. Alternatively, the cured product of the adhesive composition for a semiconductor may have a water contact angle of 150 degrees or less. It is possible to reduce the wettability of the adhesive composition for a semiconductor by adjusting the water contact angle of the cured product within the above-described range, thereby reducing the fillet length.

Hereinafter, the present invention will be described in detail with reference to examples in order to specifically describe the present invention. However, the examples according to the present invention may be modified in various other forms, and the scope of the present invention is not construed as being limited to the examples described below. The examples in the present specification are provided in order to more completely describe the present invention to those having average knowledge in the art.

Example 1

(1) Preparation of Thermoplastic Resin 40 g of butyl acrylate, 26 g of ethyl acrylate, 25 g of acrylonitrile, 5 g of methyl methacrylate, 10 g of glycidyl methacrylate, 0.1 g of a thermal initiator azobisisobutyronitrile (AIBN) were mixed with 100 g of toluene, and the mixture was reacted at 100° C. for about 12 hours to prepare a thermoplastic acrylate-based resin in which a glycidyl group was introduced as a branched chain.

(2) Preparation of Resin Composition Solution for Adhesive Film

A mixture was prepared by mixing 50 g of a phenol resin KH-6021 (DIC corporation, bisphenol A novolac resin, hydroxyl equivalent weight of 121 g/eq, softening point: 133° C.) which is a curing agent for an epoxy resin, 30 g of a liquid epoxy resin RE-310S (Nippon Kayaku, bisphenol A epoxy resin, epoxy equivalent weight of 180 g/eq, viscosity [25° C.]: 15,000 mPa·s), 30 g of a solid epoxy resin EOCN-104S (Nippon Kayaku, cresol novolac-type epoxy resin, epoxy equivalent weight of 214 g/eq, softening point: 92° C.), 40 g of the thermoplastic acrylate-based resin, 1 g of a silane coupling agent (KBM-403, Shin-Etsu Chemical, gamma-glycidoxypropyltrimethoxysilane), 0.2 g of a curing catalyst 2PZ (Shikoku Kasei, 2-phenyl imidazole) and 90 g of an inorganic filler SC-2050 (Admatech, spherical silica, average particle diameter: about 400 nm) in a methyl ethyl ketone as a solvent. Subsequently, polysorbate (TCI CHEMICALS, TWEEN 80), which is a nonionic surfactant, was added thereto in an amount of about 0.5 parts by weight based on 100 parts by weight of the total content of the liquid epoxy resin, the solid epoxy resin, and the thermoplastic acrylate-based resin to obtain an adhesive composition for a semiconductor (solid content concentration: 40% by weight).

The adhesive composition for a semiconductor thus prepared was applied on a release-treated polyethylene terephthalate film (38 μm in thickness) and dried at 110° C. for 3 minutes to obtain an adhesive film for a semiconductor.

The adhesive film for a semiconductor having a thickness of 10 μm (adhesive film for a first semiconductor element) and the adhesive film for a semiconductor having a thickness of 110 μm (adhesive film for a second semiconductor element and embedded film for the first semiconductor element) were manufactured.

(3) Manufacture of Semiconductor Device

The adhesive film for a semiconductor having a thickness of 10 μm was attached to one surface of a square first semiconductor element (50 μm in thickness) having a side of 3 mm at a temperature of 70° C. The first semiconductor element was adhered to a ball grid array (BGA) substrate through the adhesive film.

Herein, the adhesion was performed by applying a pressure of 1 kgf for 1 second at a temperature of 125° C. The BGA substrate to which the first semiconductor element was adhered was subjected to heat treatment using a dryer at a temperature of 125° C. for 1 hour to heat-cure the adhesive film. Then, a wire of 23 μm in diameter was wire-bonded on the first semiconductor element at a pitch of 100 μm at a temperature of 150° C. by using a wire bonder (Shingawa Co., Ltd., product name UTC-1000).

Separately, the adhesive film for a semiconductor having a thickness of 110 μm was attached to one surface of a square second semiconductor element (80 μm in thickness) having a side of 10 mm under the condition of 70° C. The second semiconductor element was adhered through the adhesive film so that the first semiconductor device on the BGA substrate is embedded. That is, the adhesion allowed the first semiconductor element to be embedded between the second semiconductor element and the BGA substrate. Herein, the adhesion was performed by applying a pressure of 2 kgf for 1 second at a temperature of 110° C.

Example 2

The semiconductor device was manufactured in the same manner as in Example 1, except that polysorbate (TCI CHEMICALS, TWEEN 80), which is a nonionic surfactant, was included in an amount of about 7 parts by weight, based on 100 parts by weight of the total content of the liquid epoxy resin, the solid epoxy resin, and the thermoplastic acrylate-based resin, in the process of preparing the resin composition solution for an adhesive film in Example 1.

Example 3

The semiconductor device was manufactured in the same manner as in Example 1, except that instead of polysorbate (TCI CHEMICALS, TWEEN 80), which is a nonionic surfactant, polyethylene glycol (Sigma-Aldrich, Triton X-100) was included in an amount of about 2 parts by weight, based on 100 parts by weight of the total content of the liquid epoxy resin, the solid epoxy resin, and the thermoplastic acrylate-based resin, in the process of preparing the resin composition solution for an adhesive film in Example 1.

Comparative Example 1

The semiconductor device was manufactured in the same manner as in Example 1, except that the nonionic surfactant was not included in Example 1.

Comparative Example 2

The semiconductor device was manufactured in the same manner as in Example 1, except that polysorbate (TCI CHEMICALS, TWEEN 80), which is a nonionic surfactant, was included in an amount of about 0.02 parts by weight, based on 100 parts by weight of the total content of the liquid epoxy resin, the solid epoxy resin, and the thermoplastic acrylate-based resin, in the process of preparing the resin composition solution for an adhesive film in Example 1.

Comparative Example 3

The semiconductor device was manufactured in the same manner as in Example 1, except that polysorbate (TCI CHEMICALS, TWEEN 80), which is a nonionic surfactant, was included in an amount of about 15 parts by weight, based on 100 parts by weight of the total content of the liquid epoxy resin, the solid epoxy resin, and the thermoplastic acrylate-based resin, in the process of preparing the resin composition solution for an adhesive film in Example 1.

Experimental Example 1

Evaluation of Embedding Property

As in the semiconductor devices described in the above Examples and Comparative Examples, the BGA substrate to which the second semiconductor element was adhered was subjected to heat treatment by using a pressure dryer under the conditions of 135° C., 1 hour, and 7 atmospheres to heat-cure the adhesive film, thereby manufacturing a semiconductor device.

For the semiconductor devices manufactured above, the number of specimens in which voids were observed in the adhesive layer was measured by using a scan acoustic tomograph (SAT), which is an ultrasonic imaging equipment. The voids was observed based on the result of imaging the specimen by measuring the voids in a transmission mode using a sonifier in a state in which the specimen is immersed in distilled water.

The case in which the semiconductor element was well embedded in the adhesive layer without voids was evaluated as 「o」 and the case in which voids was observed in the adhesive layer was evaluated as 「x」. The evaluation results are shown in Table 1 below.

Experimental Example 2

Measurement of Amount of Fillet

After the semiconductor device was manufactured as in Experimental Example 1, amounts of adhesive bled out to the surrounding of the second semiconductor elements were measured, and the largest length of the adhesive bled out per second semiconductor element was measured. The measurement results are shown in Table 1 below.

TABLE 1

|  | Evaluation of embedding property | Measurement of amount of fillet (μm) |
|---|---|---|
| Example 1 | O | 59 |
| Example 2 | O | 50 |
| Example 3 | O | 58 |
| Comparative Example 1 | X | 65 |
| Comparative Example 2 | X | 64 |
| Comparative Example 3 | X | — |

Referring to Table 1 and FIGS. 1 and 2, FIGS. 1A and 1B are a side cross-sectional view and front view of a semiconductor package, respectively, in which an adhesive film for a semiconductor according to each of Examples 1 to 3 is used. It was confirmed from Examples 1 to 3 that no voids 1 were occurred between a controller 17 and the adhesive film, and bleed-out of the adhesive composition 111 for a semiconductor was reduced, as shown in FIG. 1.

On the contrary, FIGS. 2A and 2B are a side cross-sectional view and front view of a semiconductor package, respectively, in which the adhesive film for a semiconductor according to each of Comparative Examples 1 to 3 is used. It was confirmed from Comparative Examples 1 to 3 that voids 1 occurred between a controller 17 and a conventional adhesive film 11, and bleed-out of the adhesive occurred, thereby increasing the fillet length, as shown in FIG. 2. Specifically, it was confirmed from Comparative Example 1 that the no nonionic surfactant was included, thereby increasing the amount of the fillet, and from Comparative Example 2 that a very small amount of the nonionic surfactant was included, thereby increasing the amount of the fillet. Further, it was confirmed from Comparative Example 3 that the nonionic surfactant was excessively included, so that the nonionic surfactant component was bled out.

DESCRIPTION OF REFERENCE NUMERAL

1: Viods
11: Conventional Adhesive Film
13: Chip (Second Semiconductor Element)
15: Substrate (BGA Substrate)
17: Controller (First Semiconductor Element)
111: Adhesive Composition For a Semiconductor

The invention claimed is:

1. An adhesive composition for a semiconductor, comprising a thermosetting resin, a thermoplastic resin, a curing agent and a nonionic surfactant,
    wherein the content of the nonionic surfactant is 0.1 to 10 parts by weight, based on 100 parts by weight of the total content of the thermosetting resin and the thermoplastic resin, and
    wherein the thermoplastic resin includes a (meth)acrylate-based resin including 0.1% to 30% by weight of a (meth)acrylate-based repeating unit having an epoxy-based functional group.

2. The adhesive composition of claim 1, wherein the nonionic surfactant is one selected from the group consisting of polyoxyethylene alkyl ether, oleic acid diethanolamide, polysorbate, polyethylene glycol, hydroxyethyl cellulose, and a combination thereof.

3. An adhesive film for a semiconductor, comprising a cured product of the adhesive composition for a semiconductor of claim 2.

4. The adhesive film of claim 3, wherein the cured product has a water contact angle of 150 degrees or less.

5. The adhesive composition of claim 1, wherein the thermosetting resin includes a liquid epoxy resin having a viscosity of 1 mPa's to 20,000 mPa's at a temperature of 20°

C. to 25° C., and the curing agent includes a novolac-based phenol resin having a softening point of 60° C. to 150° C.

6. The adhesive composition of claim 1, further comprising a curing catalyst and an inorganic filler.

7. The adhesive composition of claim 6, wherein the curing catalyst includes one selected from the group consisting of phosphorus-based compounds, boron-based compounds, phosphorus-boron-based compounds, imidazole-based compounds, and a combination thereof.

8. The adhesive composition of claim 6, wherein the inorganic filler includes one selected from the group consisting of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, aluminum borate, and a combination thereof.

9. The adhesive composition of claim 8, wherein the inorganic filler includes silica and magnesium carbonate at a weight ratio of 1:0.001 to 1:1.

10. An adhesive film for a semiconductor, comprising a cured product of the adhesive composition for a semiconductor of claim 1.

11. The adhesive film of claim 10, wherein the cured product has a water contact angle of 150 degrees or less.

* * * * *